Sept. 25, 1928.
F. L. ALLEN
1,685,621
METHOD AND APPARATUS FOR SCREENING FLUIDS
Filed Nov. 2, 1927 2 Sheets-Sheet 2
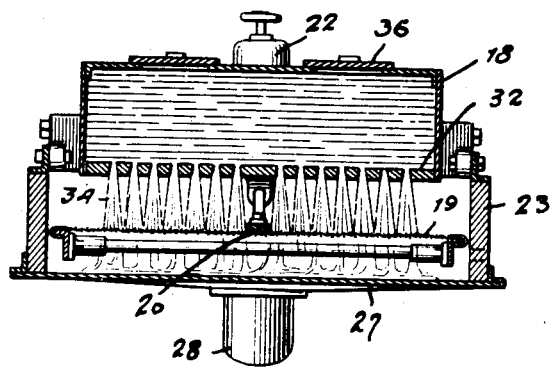
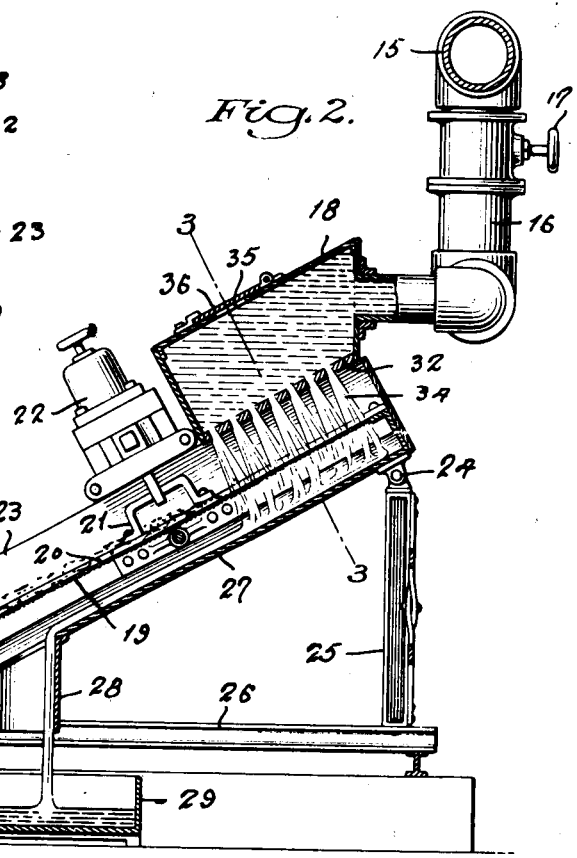
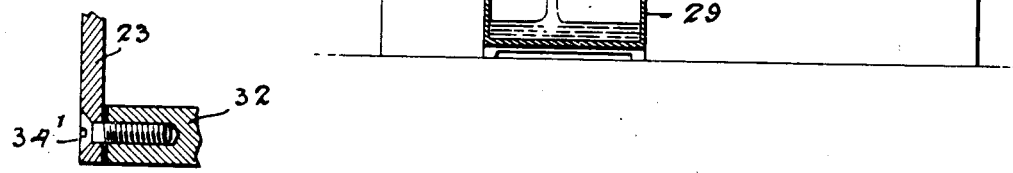
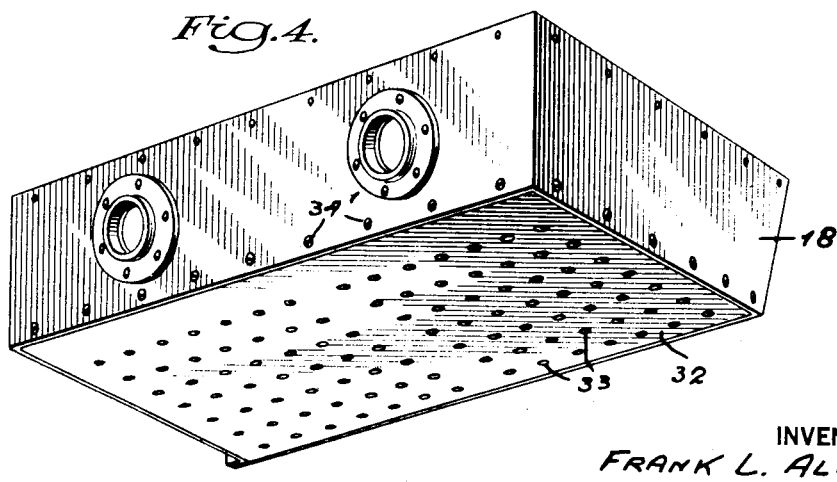
INVENTOR
FRANK L. ALLEN
BY
ATTORNEYS Patented Sept. 25, 1928.

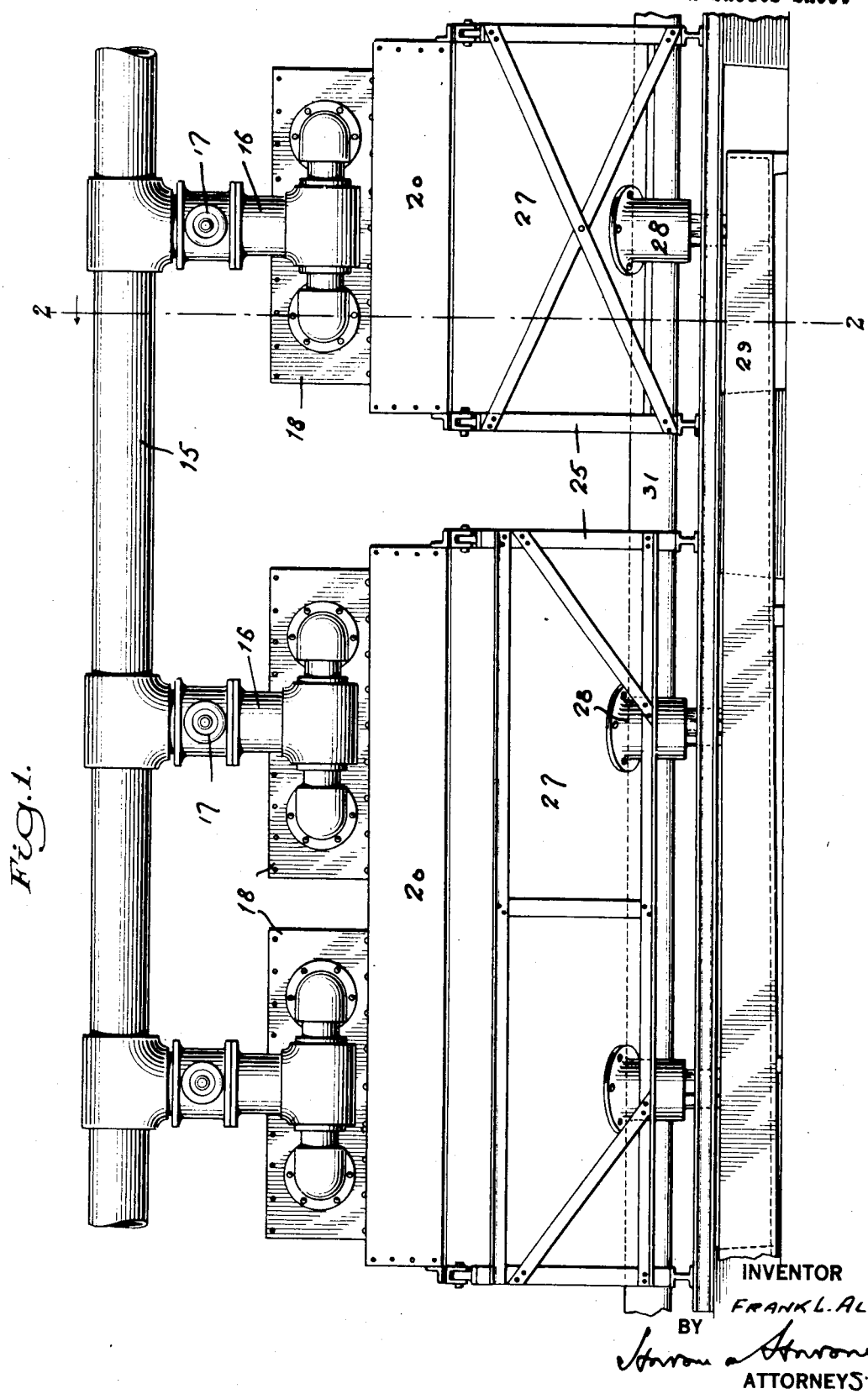

1,685,621

UNITED STATES PATENT OFFICE.

FRANK L. ALLEN, OF MONTCLAIR, NEW JERSEY.

METHOD AND APPARATUS FOR SCREENING FLUIDS.

Application filed November 2, 1927. Serial No. 230,519.

My invention relates to method and apparatus for screening fluids, and particularly to the screening out of fine or difficultly removable materials carried by liquids. The object of my invention is to increase the output of the screening apparatus by so delivering fluid to the screen, and so operating the latter that a maximum flow of fluid through the screen is obtained, and a minimum clogging of the screen openings by the materials withheld from passage therethrough. The automatic continuous removal of the withheld material from the screen surface is contemplated so that the screening operation may be substantially continuous and uninterrupted.

My invention is applicable to treatment of many fluids. I have applied it successfully to the screening of bagacillo from raw sugar juices, one of the most difficult fluids to screen efficiently, and for the purpose of illustration I have indicated an appropriate layout therefor in the accompanying drawings, in which—

Fig. 1 is an elevation of a screen battery and associated feed pipes and delivery appliances;

Fig. 2 is a section on the line 2—2, Fig. 1;

Fig. 3 is a section on the line 3—3, Fig. 2;

Fig. 4 is a perspective view of one of the delivery appliances; and

Fig. 5 is a section through a detail of the latter.

There are many fluids which contain light or fine suspended matter which it is desirable to separate from the liquid. Filtration is a slow operation. It is also objectionable by reason of the fact that the withheld matter is not only lost, but that it gradually chokes the filter. Screening is preferable because the screen can be readily cleaned when it becomes choked. On the other hand screening is subject to the serious objection that the withheld matter tends to form a matte or blanket which impedes the screening operation and, if the screen be inclined, forms a surface over which the liquid tends to flow with substantially no screening operation whatsoever. Continuously operating rakes travelling over the screening surface only partially relieve this condition. It has also been proposed to vibrate the screen in the expectation that the vibratory action would maintain the screen openings clear while at the same time causing the withheld material to travel downward by gravity along the length of the screen when the latter is operated in inclined position. While the automatic downward travel of the withheld material is accomplished by this arrangement, the maintenance of the screen openings clear is not, and the withheld material rapidly forms a matte over which the liquid flows to bagacillo discharge with very inefficient screening action.

My experiments with vibrating inclined screens have established the fact that objectionable matte formation may be prevented and a greatly increased yield obtained if the fluid be delivered to a relatively large area of the screen in the form of jets under pressure, the direction of the jets being substantially normal to the plane of the screen. I have found that the combined action of the vibrating screen, and the fluid jets striking the screen, not only prevents the formation of a matte in the jet area, but that a very complete screening operation is effected since the screen openings in the jet area are maintained free of obstruction. The velocity of the fluid jets striking the screen must be carefully predetermined to prevent the withheld material from being driven through the screen. At properly predetermined velocity—which will of course differ with the fluid being handled—the liquid passes freely through the screen at the point of jet impact, while the combined vibration of the screen and jet action keeps the withheld material in such state of agitation that no obstruction of the screen occurs in the jet area, although the material gradually travels downward on the surface of the inclined screen, and on passing out of the jet area promptly forms a matte which moves continuously down the vibrating screen to its lower or discharge end. The screening action is practically complete in the jet area, and the yield of clean liquid far in excess of anything heretofore obtained, so far as I am aware.

Apparatus appropriate for use in screening bagacillo from raw sugar juices as illustrated in the accompanying drawings. Thus in Fig. 1 I have shown a feed main 15 through which the raw sugar juice passes under pressure. Branches 16 with control valve 17 deliver the juice to pressure boxes 18 associated with the rapidly vibrated inclined screens 19. At the left of Fig. 1 I have indicated a pair of pressure boxes 18 for a single large screen; and at the right of this figure a single pressure box associated with a screen of less width.

The particular construction of the screen 19 does not enter into my invention, and it may be of any appropriate character. For screening bagacillo from raw sugar juice, it is a fine mesh. Ordinarily the sugar juice delivered through the feed pipe 15 has already passed a perforated plate the area of the holes in which being equivalent to a woven wire of 10 to 20 mesh. The screen 19 which is used to remove bagacillo must be very much finer, say 40 to 150 mesh screen.

In the form here shown, the screen 19 is engaged with a vibrating frame 20 connected at 21 to an electric vibrator 22 by which very rapid vibrations, say 1500 per minute or more, are imparted to the screen in a direction at right angles to its plane. The screen box 23 supports the stationary elements of the vibrator 22 and also the pressure box 18. It is mounted on an incline, its upper end being pivoted at 24 to a supporting standard 25, and its lower end adjustably supported in any suitable fashion from the frame 26. The screen 19 is spaced from the box bottom 27 and the juices passing through the screen flow over the box bottom to a discharge chute 28 through which they are led to the draw-off conduit 29. The bagacillo rejected by the screen forms a matte 30 which works downward on the surface of the screen and discharges freely from its lower end to the trough 31.

The pressure box 18 through which the raw sugar juice is delivered to the screen, is supported at the upper end of the screen box 23. The bottom of the pressure box is constituted by a jet plate 32 pierced by numerous jet holes 33, the walls of which are preferably flared to form spreading or expanding jets 34. Preferably the holes 33 are so numerous and the inclination of the hole walls such that the juices impinge against the screen throughout the entire area beneath the pressure box. The jets impinging in this fashion over the entire area subjacent the pressure box, serve in connection with the rapid vibration of the screen to keep the withheld bagacillo in a state of agitation with the result that the formation of the matte 30 occurs below the jet area and consequently presents no obstruction to the straining action of the screen 19. In addition these jets also help to keep the mesh free from becoming plugged with the gums (prevalent in sugar juice) resulting from fermentation and other causes.

I regard it as important that the jets be delivered to the screen in a direction substantially at right angles to the plane of the screen, and that they be delivered under pressure. The velocity of the jet may be regulated either by properly regulating the supply of juice to the pressure box, or by varying the size of the openings in the jet plate 32. For the latter purpose the plate is preferably readily removable from the box. I have indicated its support therein by a series of screws 34' taking into the side margins of the plate. Any suitable means for supporting the jet plate may be employed, so long as it is made readily removable.

In order to provide means for cleaning the jet plate 32, should it become clogged by sediment within the pressure box, I provide handholes 35 in the top of the box, with appropriate closure plates 36. A rake or sweep may be provided to clean the inner surface of the jet screen 32, or both rake and handholes may be omitted if the mounting of the jet plate 32 in the box 18 be such that it may be readily withdrawn for cleaning.

It will be noted that the jet apertures 33 are so arranged that no juice is directed against the vibrating frame 20 (see Fig. 2). There is no loss of screening action at this point, and the juices delivered from the pressure box have no opportunity to acquire a downward travel by gravity before they reach the screen. The entire delivery from the pressure box impacts against the screen in a direction substantially normal thereto, and at a considerable velocity.

The area of the screen to which the juices are delivered will vary with the area of the pressure box, but it will be noted that the jets are delivered substantially the full width of the screen over more than one third of its length. This large jet area is important in increasing the yield of clear juice, although the quantity delivered to the screen may not materially exceed that now commonly delivered by the usual flow feed.

Practically the entire screening operation occurs in the area of jet impact, and the matte 30 forms below the jet area. If the liquor acquires a downward direction of flow over the matte, practically no screening action takes place in spite of the fact that the vibration of the screen is quite as violent in this area as it is in the area to which the jets are delivered.

As I have above stated, my invention is applicable to the screening of other fluids than raw sugar juice, but I have found that it is exceedingly effective in the removal of bagacillo from the latter—a screening operation which has hitherto proved one of the most difficult and tedious operations in the preparation of the sugar juices for further treatment. The details of the construction of screen and jet feed are subject to wide variation, while still embodying my thoughts and accomplishing my results. The accompanying illustration is therefore to be considered merely as an illustative example of a suitable construction for carrying out what I claim as my invention.

I claim—

1. The method of screening bagacillo from raw sugar juice, which comprises directing the juice in a large number of jets under pressure against an inclined screen, said jets being closely spaced transversely and longitudinally of the screen, and simultaneously subjecting the screen to rapid vibration to prevent the formation of an obstructing matte upon the surface of the screen by the withheld bagacillo, and to cause the latter to move downward out of the jet area by the action of gravity.

2. The method of preventing screen obstruction by withheld bagacillo on the screening of raw sugar juices, which comprises simultaneously directing the juices under pressure and in numerous jets against a large area of the screen and rapidly vibrating the latter in inclined position.

3. The method of preventing obstruction of screen apertures by materials withheld from the fluid screened, which comprises agitating said materials on the screen surface by the combined action of rapid screen vibration and the impingement of a large group of fluid jets under pressure against a large area of the screen surface.

4. The method of screening materials from fluids which comprises subdividing the fluid into a large group of jets under pressure, directing said jets against a large area of an inclined screen surface in a direction substantially normal to the latter, and rapidly vibrating the screen, whereby the screening action is confined substantially to the jet area, and the material rejected by the screen is prevented from obstructing the screen openings in said area and caused to move downward on the screen out of said jet area.

5. Apparatus for screening bagacillo from raw sugar juice comprising an inclined screen, means for subjecting the same to rapid vibration, and means for directing the sugar juice against the upper portion of the screen in a direction substantially normal thereto and in the form of a large number of jets under pressure, the velocity and volume of said jets being sufficient to maintain clear the openings in the vibrating screen.

6. Apparatus for screening bagacillo from raw sugar juice which comprises an inclined screen, means for rapidly vibrating the same, and a feed box above the same, the bottom of said feed box comprising a perforated plate substantially parallel to the screen, and means for passing raw sugar juice into said box under pressure to cause the delivery of the juice to the screen in the form of a large number of pressure jets impinging against the vibrating screen substantially at right angles thereto.

In testimony whereof I have signed my name to this specification.

FRANK L. ALLEN.